United States Patent [19]

Reil

[11] Patent Number: 5,257,885
[45] Date of Patent: Nov. 2, 1993

[54] ROUND BALE WINDROWER

[76] Inventor: Glen Reil, Box 218, Tofield, Alberta, Canada, T0B 4J0

[21] Appl. No.: 848,229

[22] Filed: Mar. 9, 1992

[51] Int. Cl.⁵ .......................................... A01D 90/10
[52] U.S. Cl. .................................. 414/24.5; 414/469; 414/482; 280/490.1
[58] Field of Search ................. 414/24.5, 482, 483, 414/484, 485, 469; 280/490.1, 494

[56] References Cited

U.S. PATENT DOCUMENTS

| | | | |
|---|---|---|---|
| 1,407,365 | 2/1922 | Wright | 280/490.1 X |
| 3,221,911 | 12/1965 | Modloff et al. | 414/469 |
| 3,843,163 | 10/1974 | Hale | 280/490.1 |
| 3,938,682 | 2/1976 | Rowe | 414/469 X |
| 3,941,265 | 3/1976 | Nunnally, Jr. | 414/482 |
| 3,944,095 | 3/1976 | Brown | 414/24.5 |
| 4,348,143 | 9/1982 | Hedgespeth | 414/24.5 |
| 4,411,572 | 10/1983 | Hostetler | 414/24.5 |
| 4,428,706 | 1/1984 | Butler et al. | 414/24.5 |
| 4,685,855 | 8/1987 | Celli | 414/482 |
| 5,033,931 | 7/1991 | Mann | 414/469 X |

FOREIGN PATENT DOCUMENTS

| | | |
|---|---|---|
| 1039242 | 9/1978 | Canada. |
| 1047447 | 1/1979 | Canada. |
| 1096819 | 3/1981 | Canada. |
| 1114620 | 12/1981 | Canada. |
| 1137930 | 12/1982 | Canada. |
| 2192856A | 1/1988 | United Kingdom. |

Primary Examiner—Robert P. Olszewski
Assistant Examiner—Dean A. Reichard
Attorney, Agent, or Firm—George H. Dunsmuir

[57] ABSTRACT

In general, round bale carriers are somewhat bulky and expensive devices suitable for use only on larger farms. A relatively simple carrier for attachment to a baler includes a rectangular, rear wheel carried main frame for articulated connection to a baler using a small auxiliary frame, the main frame sloping rearwardly in use to a pair of pivotable V-shaped arms which normally maintain the bale on the main frame. When the carrier reaches a desired location, e.g. a windrow, the arms are rotated by actuating a hydraulic cylinder to dump the bale.

10 Claims, 2 Drawing Sheets

ROUND BALE WINDROWER

BACKGROUND OF THE INVENTION

This invention relates to a bale carrier, and in particular to a carrier for a so-called round bale.

In general, round bales are bulky and difficult to handle. Since the advent of round bales, a large number of apparatuses have been devised for handling and/or carrying the bales. Examples of such apparatuses are described in Canadian Patents Nos. 1,039,242, issued to B. K. Honomichl, Sr. on Sep. 26, 1978; 1,047,447, issued to J. L. Schurz on Jan. 30, 1979; 1,096,819, issued to J. M. P. Fry on Mar. 3, 1981; 1,114,620, issued to K. G. M. Ward et al on Dec. 22, 1981 and 1,137,930 issued to T. J. Konechne on Dec. 21, 1982.

Most of the patented apparatuses and other devices for handling round bales are somewhat large, expensive and cumbersome. Moreover, most existing apparatuses cannot readily be attached to a baler for carrying a bale of hay to a desired location in the field.

SUMMARY OF THE INVENTION

The object of the present invention is to solve the above-identified problem by providing a relatively simple round bale carrier, which can be used to receive a round bale from a baler, and retain the bale for dumping in a windrow.

SUMMARY OF THE INVENTION

Accordingly, the present invention relates to a round bale carrier comprising elongated frame means; coupler means for pivotally connecting the front end of said frame means to the trailing end of a baler for receiving round bales therefrom, said coupler means permitting limited rotation of said frame means around the longitudinal axis there; and supporting the front end of said frame means above the rear end thereof, whereby round bales received by said frame means move to the rear thereof; wheel means supporting the rear end of said frame means for movement along the ground; arm means pivotally connected to said rear end of said frame means for supporting a bale in a transport position; and cylinder means for rotating the arm means from the transport to an unloading position in which the bale is permitted to fall from the carrier.

BRIEF DESCRIPTION OF THE DRAWINGS

The invention will be described in greater detail with reference to the accompanying drawings, which illustrate a preferred embodiment of the invention, and wherein.

DESCRIPTION OF THE PREFERRED EMBODIMENTS

Figure 1:
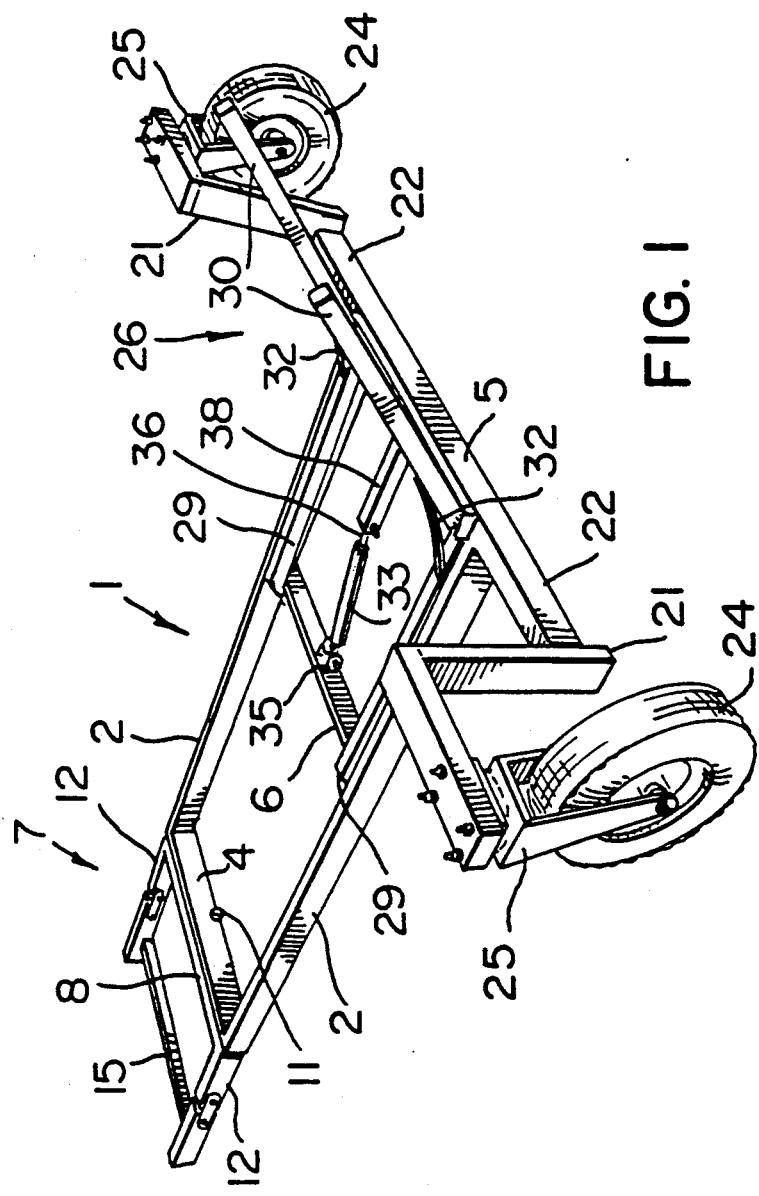
FIG. 1 is a perspective view of a round bale carrier in accordance with the present invention in a bale receiving position.

Referring to the drawings, a bale carrier in accordance with the present invention includes a main frame generally indicated at 1. The frame 1 is defined by a pair of sides 2 interconnected by a front end 4, a rear end 5, and a crossbar 6. The crossbar 6 extends between the bottoms of the sides 2. The front end 4 of the frame 1 is connected to a baler (not shown) by a coupling device defined by an auxiliary frame generally indicated at 7. The frame 7 includes a rear end 8 pivotally connected to the front end of the frame 1 by a bolt 10 and a nut 11 for rotation around the longitudinal axis of the frame 1, i.e. the main frame 1 and the auxiliary frame 7 are pivotally interconnected for rotation relative to each other around the longitudinal axes of such frames. A pair of articulated sides 12 extend forwardly from the rear end 8 of the frame 7. The sides 12 include front sections 14 interconnected at their front ends by a crossbar 15. Connector strips 16 extend between 14 and 12, and bolts 19 extend through the strips 16 and the front ends of the sections 18 to pivotally interconnect the front end rear sections 14 and 18, respectively. Thus, the front sections 14 of each side 12 can be rotated upwardly or downwardly with respect to the rear section 18. This arrangement permits adjustment of the height of the front end of the carrier with respect to the rear end thereof, so that bales are caused to roll or slide along the frame 1 towards the rear end 5 thereof. The articulated sides 12 also facilitate adapting of the apparatus to a variety of balers.

The rear end 5 of the frame 1 extends outwardly beyond the sides 2. Inverted L-shaped arms 21 are connected to the outer ends 22 of the frame end 5. Wheels 24 and wheel yokes 25 are mounted beneath the outer free ends of the arms 21. The wheels and yokes are freely castering to facilitate turning of the carrier with a towing vehicle.

An arm assembly generally indicated at 26 is pivotally mounted on the rear end 5 of the frame 1 for rotation around the transverse axis of such end 5. The arm assembly 26 includes a crossbar 28 which is pivotally connected to the frame end 5, a first pair of arms 29 extending forwardly from the ends of the crossbar 28, and a second pair of arms 30 extending rearwardly from the ends of the crossbar 28. In effect, each pair of arms 29 and 30 at each end of the crossbar 28 defines a generally V-shaped arm extending longitudinally of the frame 1. The arms 29 and 30 are interconnected by an arcuate reinforcing strip 32 proximate the bottom ends of such arms. A hydraulic cylinder 33 is pivotally mounted in a clevis 35 on the rear center of the crossbar 6. A piston rod 36 extends rearwardly from the cylinder 33 to the front free end of a bar 38 extending forwardly from the center of the crossbar 28. The piston rod 36 is pivotally connected to such bar 38, so that the cylinder 33 can be used to rotate the arm assembly 26 relative to the frame end 5.

Figure 2:
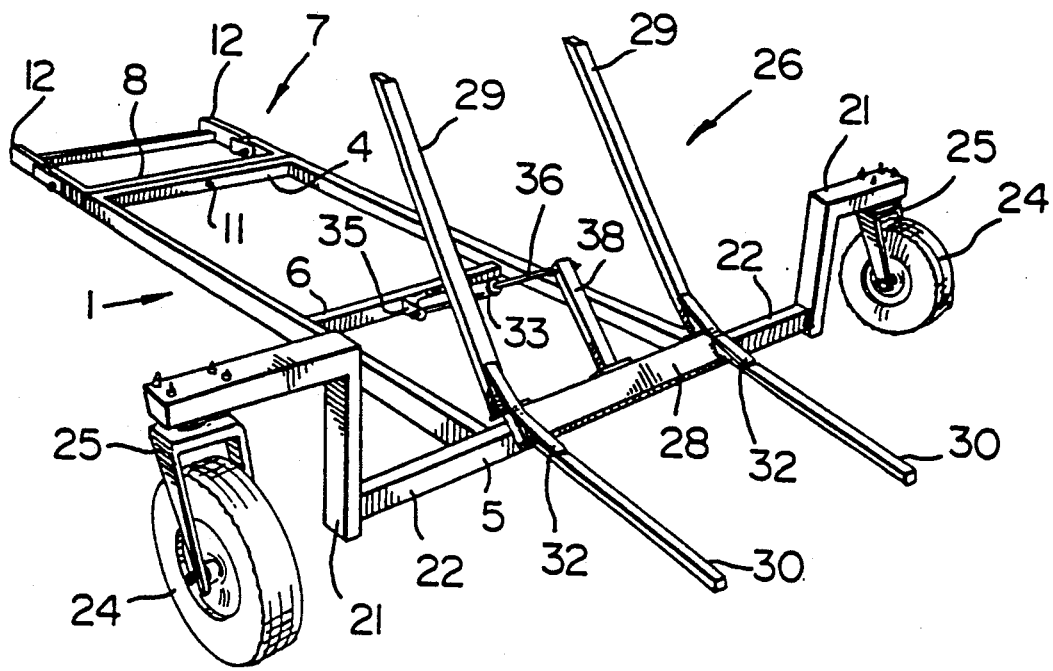
FIG. 2 is a perspective view of the bale carrier of FIG. 1 in a bale dumping position.
Figure 3:
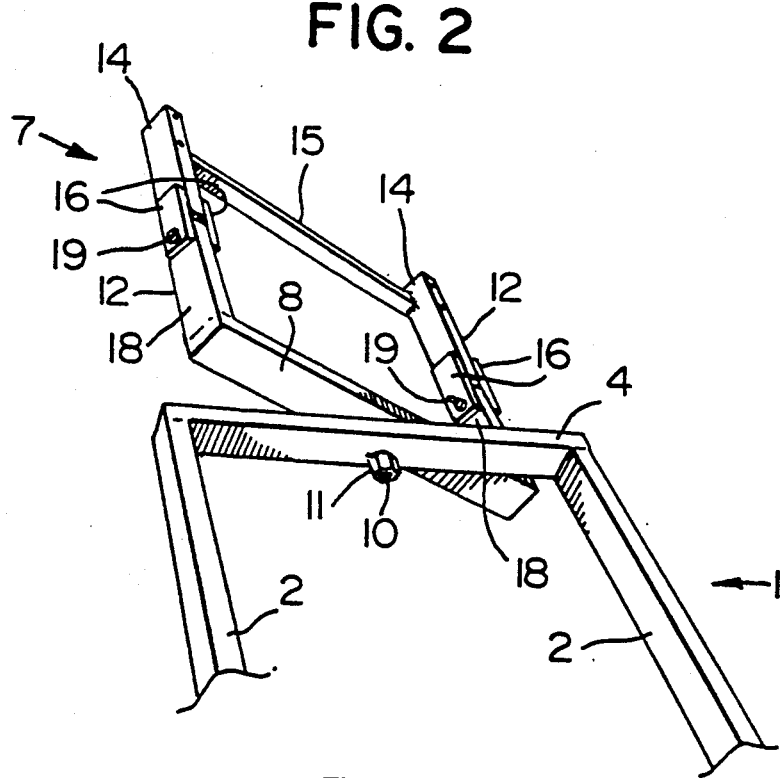
FIG. 3 is a perspective view of the front end of the bale carrier of FIGS. 1 and 2.

With the carrier attached to the rear end of a baler and the piston rod 36 retracted in the cylinder 33, the arms 30 of the arm assembly 26 extend upwardly and rearwardly (FIG. 1). The arms 29 are horizontal, extending forwardly between the frame sides 2 with the front ends resting on the crossbar 6. In this position, the top surfaces of the arms 29 are flush with the top surfaces of the sides 2. A bale falling onto the frame 1 is arrested by the arms 30. The carrier can be towed around a field with the bale thereon. The pivotable connection of the main and auxiliary frames 1 and 7, respectively permits the main frame 1 to remain more or less horizontal on uneven ground. When the vehicle reaches the desired location in a field, the cylinder 33 is actuated to extend the piston rod 36 (FIG. 2). Such action causes the arm assembly 26 to rotate so that the arms 30 are inclined downwardly and rearwardly which effects bale unloading.

What I claim is:

1. A round bale carrier, comprising:
 a) an elongated frame having front and rear ends and a top;
 b) a coupler for pivotally connecting said front end of said frame to a trailing end of a baler such that said front end of said frame is higher than said rear end whereby round bales received by said frame from the bailer move toward said rear end;
 c) a plurality of pivotable generally V-shaped arms having vertices, said vertices providing a pivot point at said rear end of said frame, each of said arms having front and rear members;
 d) said front members being flush with said top of said frame and said rear members being inclined upwardly from said vertices into the path of travel of the received bale when said arms are in a receiving position;
 e) said front members being inclined upwardly from said vertices and said rear members being inclined downwardly and rearwardly from said vertices when said arms are in an unloading position;
 f) an actuator operably associated with said frame and said arms for moving said arms between said receiving and unloading positions; and
 g) wheels secured to said rear end of said frame for supporting said frame on the ground.

2. A round bale carrier as in claim 1, wherein:
 a) said coupler comprises an auxiliary frame pivotally connected to said elongated frame.

3. A round bale carrier as in claim 2, wherein:
 a) said elongated frame and auxiliary frame are rectangular having longitudinal axes; and
 b) said elongated frame and auxiliary frame are rotatable about their longitudinal axes.

4. A round bale carrier as in claim 2, wherein:
 a) said auxiliary frame includes articulated sides.

5. A round bale carrier as in claim 1, wherein:
 a) said arms include a crossbar pivotally connected to said rear end of said frame; and
 b) said vertices are secured to said crossbar.

6. A round bale carrier, comprising:
 a) an elongated frame having front and rear ends;
 b) a coupler for pivotally connecting said front end of said elongated frame to a trailing end of a baler such that said front end of said elongated frame is higher than said rear end whereby round bales received by said elongated frame from the bailer move toward said rear end;
 c) a plurality of pivotable arms disposed at said rear end of said elongated frame, said arms having a receiving position adapted to receive the round bales from the baler and an unloading position adapted to permit the round bales to be unloaded from said elongated frame;
 d) said coupler including an auxiliary frame pivotally connected to said front end of said elongated frame along a longitudinal axis of said elongated frame;
 e) said auxiliary frame including articulating sides;
 f) an actuator operably associated with said elongated frame and said arms for moving said arms between said receiving and unloading positions; and
 g) wheels secured to said rear end of said elongated frame for supporting said elongated frame on the ground.

7. A round bale carrier as in claim 6, wherein:
 a) said elongated frame and auxiliary frame are rectangular having longitudinal axes; and
 b) said elongated frame and auxiliary frame are rotatable about their longitudinal axes.

8. A round bale carrier as in claim 6, wherein:
 a) said arms form vertices;
 b) said arms include a crossbar pivotally connected to said rear end of said frame; and
 b) said vertices are secured to said crossbar.

9. A round bale carrier as in claim 6, wherein:
 a) each of said arms is generally V-shaped having front and rear members positionable in said receiving position such that the bale is received between said members.

10. A round bale carrier as in claim 9, wherein:
 a) said elongated frame includes a top;
 b) said front members are flush with said top of said elongated frame and said rear members are inclined upwardly into the path of travel of the received bale when said arms are in said receiving position; and
 c) said front members are inclined upwardly and said rear members are inclined downwardly and rearwardly when said arms are in said unloading position.

* * * * *